(12) United States Patent
Hara et al.

(10) Patent No.: US 7,340,969 B2
(45) Date of Patent: Mar. 11, 2008

(54) ROTATION-DETECTING APPARATUS

(75) Inventors: Takashi Hara, Ichinomiya (JP); Kenichi Taguchi, Toyota (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 42 days.

(21) Appl. No.: 11/086,573

(22) Filed: Mar. 23, 2005

(65) Prior Publication Data

US 2005/0211002 A1    Sep. 29, 2005

(30) Foreign Application Priority Data

Mar. 24, 2004    (JP) .............................. 2004-087283

(51) Int. Cl.
*G01L 3/00*    (2006.01)

(52) U.S. Cl. ................................. 73/862.326

(58) Field of Classification Search ............ 73/862.326
See application file for complete search history.

(56) References Cited

U.S. PATENT DOCUMENTS

| | | | | |
|---|---|---|---|---|
| 3,845,377 A | * | 10/1974 | Shimotori | .................... 318/662 |
| 3,983,953 A | * | 10/1976 | Bayle | .......................... 180/446 |
| 5,608,300 A | * | 3/1997 | Kawabata et al. | .......... 318/721 |
| 5,760,510 A | * | 6/1998 | Nomura et al. | ............. 310/90.5 |
| 5,818,188 A | * | 10/1998 | Hirai et al. | .................. 318/480 |
| 6,242,904 B1 | * | 6/2001 | Shirai et al. | ................. 324/165 |
| 6,480,138 B1 | | 11/2002 | Zinke et al. | |
| 6,687,644 B1 | | 2/2004 | Zinke et al. | |
| 6,774,642 B2 | * | 8/2004 | Lin et al. | ..................... 324/660 |
| 2001/0002791 A1 | | 6/2001 | Tsuge et al. | |

* cited by examiner

*Primary Examiner*—Edward Lefkowitz
*Assistant Examiner*—Octavia Davis
(74) *Attorney, Agent, or Firm*—Sughrue Mion, PLLC (57) ABSTRACT

A rotation-detecting apparatus includes a rotation-detecting device for detecting a rotation of a rotor, a rotational speed-detecting device (3) for detecting a rotational speed of the rotor and a transfer signal-generating device for generating a digitized transfer signal on the basis of items of transferred information. Either a pulsed first output waveform synchronized with rotation of the rotor, or a pseudo output waveform having a period independent of the period of the rotation of the rotor and having a first property that is different from that of the first output waveform, is selected on the basis of the rotational speed of the rotor. A second property of the output waveform selected is changed on the basis of the transfer signal. The output waveform of which the second property has been changed on the basis of the transfer signal is emitted.

10 Claims, 9 Drawing Sheets

ROTATION-DETECTING APPARATUS

CROSS REFERENCE TO RELATED APPLICATIONS

This application is based on and claims priority under 35 U.S.C. § 119 to Japanese Patent Application 2004-087283, filed on Mar. 24, 2004, the entire content of which is incorporated herein by reference.

FIELD OF THE INVENTION

This invention generally relates to a rotation-detecting apparatus. More particularly, this invention pertains to a rotation-detecting apparatus including a rotation-detecting means for detecting a rotation of a rotor, and a transfer signal-generating means for generating a digitized transfer signal on the basis of items of transferred information, a rotation-detecting apparatus for combining a first output waveform and the transfer signal, and for emitting the signal combined.

BACKGROUND

In systems mounted on vehicles such as an anti-lock brake system and a stability control apparatus, in order to perform such controls, a rotation-detecting apparatus is utilized for measuring a rotational speed and a rotational frequency of a wheel (a rotor). Various kinds of rotation-detecting apparatuses exist. For example, some of these rotation-detecting apparatuses can not only measure a rotational speed, or a rotational frequency, but also emit output signals to which items of information, such as a rotational direction and the result of self-inspections, can be added.

For example, US2001/0002791A1 describes a conventional technique of such a kind of apparatus. This document relates to a detection signal-processing apparatus that detects a rotational direction and a rotational speed of a rotor, and emits a rotational direction signals at timings based on the rotational speed detected. The rotational direction signals have different waveforms for indicating the rotational directions detected. Thus, the rotational direction signal, or similarly, other items of additional data, can be added to the rotational speed signal.

According to the techniques described in the document, a rotational speed of the rotor is evaluated, irrespective of whether a predetermined speed is achieved or exceeded. Because rotational direction signals with a waveform corresponding to a rotational direction of the rotor are added to the rotational signal, a transfer signal, which is also different from a rotational direction and a rotational speed of the rotor, is generated in the form of a signal pattern. Therefore, only when two conditions are fulfilled simultaneously, namely, a first condition in which a rotational speed of the rotor has achieved, or exceeded, a predetermined rotational speed, and a second condition in which a signal pattern of the kind described above is exist, the transfer signal can be emitted at a timing based on the rotational speed.

According to the technique described in the document, during a period between from a time that a rotor starts to rotate, either in a normal rotational direction or in a reverse rotational direction, and a time when the rotor achieves, or exceeds, a predetermined rotational speed, because a rotational direction is normally not suddenly changed, a state of the rotational direction is assumed to remain unchanged even when outputs of the rotational direction signal are not continuously supplied. Thereafter, when the rotational speed achieves, or exceeds, a predetermined rotational speed, the rotational speed can be recognized by use of one of the rotational direction signals emitted at a timing based on the rotational speed. Accordingly, a signal pattern, generated by combining the signal waveform corresponding to the rotational direction with the rotational speed signal, is emitted as a transfer signal.

However, by use of this method, if the vehicle is not driven, in other words, if the rotor is not rotating at a level of speed which achieves, or exceeds, a predetermined speed, additional items of data can not be added to the rotational speed signal. In other words, an item of data such as an air pressure of a tire, is preferably measured when the rotor is at a stop, in other words, when the rotor is not rotating. On such occasions, however, items of data can not be added to the rotational speed signal.

On many occasions, drivers fail not only to check an air pressure of tires, but also the state of their vehicles. Accordingly, for purposes of driving a vehicle safely, it is very important to provide a rotation-detecting apparatus that incorporates the addition of items of data.

A need thus exists for a rotation-detecting apparatus in which, independently of a rotational speed of a rotor, a rotational direction signal, or an additional item of data, can be added to a rotational speed signal.

SUMMARY OF THE INVENTION

According to an aspect of the present invention, a rotation-detecting apparatus includes a rotation-detecting means for detecting a rotation of a rotor, a rotational speed-detecting means for detecting a rotational speed of the rotor and a transfer signal-generating means for generating a digitized transfer signal on the basis of items of transferred information. Either a pulsed first output waveform synchronized with rotation of the rotor, or a pseudo output waveform having a period independent of the period of the rotation of the rotor and having a first property that is different from that of the first output waveform, is selected on the basis of the rotational speed of the rotor. A second property of the output waveform selected is changed on the basis of the transfer signal. The output waveform of which the second property has been changed on the basis of the transfer signal is emitted.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
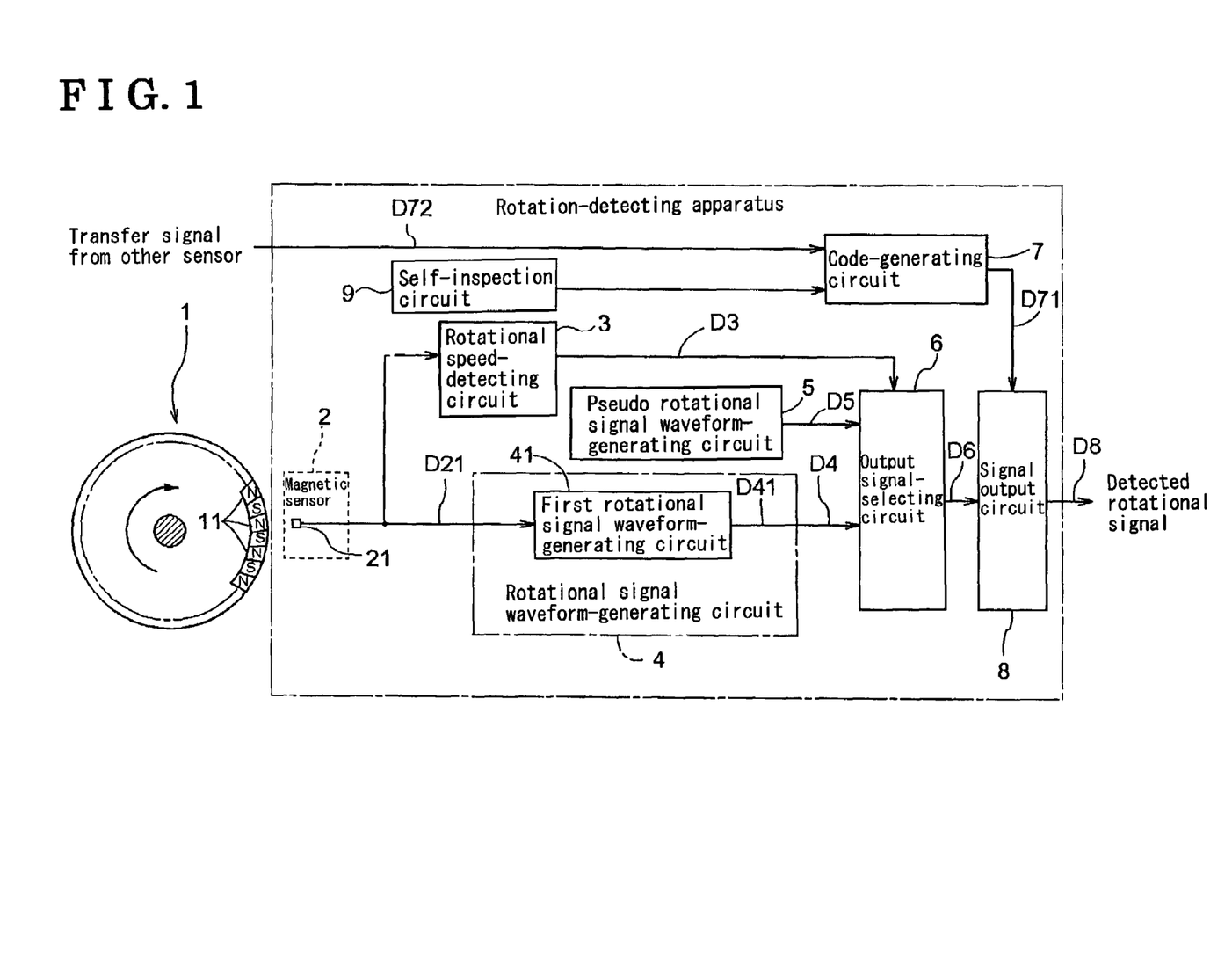
FIG. 1 represents a schematic block diagram of a rotation-detecting apparatus according to an embodiment of the present invention.

An embodiment of the present invention will be explained with reference to drawing figures. FIG. 1 represents a schematic block diagram of a rotation-detecting apparatus for detecting a rotational condition of a rotor 1 according to the embodiment of the present invention. The rotor 1 includes a magnetic body 11 provided along a peripheral portion of the rotor 1 in a peripheral direction (a rotational direction). The rotation of the rotor 1 is detected by a magnetic sensor 2 (rotation-detecting means) provided so as to be able to face the rotor 1. Alternatively, a detection of rotation can be performed by means excepting magnetic means. For example, an optical detecting method, such as an optical encoder structured with a light emitting element and a receiving element, can also be utilized.

A magnetic sensor output signal D21 detected by the magnetic sensor 2 is put into a rotational speed-detecting circuit 3 (speed-detecting means) and a rotational signal waveform-generating circuit 4 (a first output waveform-generating means). In the rotational speed-detecting circuit 3, a moving speed of the magnetic body 11 attached to the rotor 1 passing in front of the magnetic sensor 2 is detected on the basis of the magnetic sensor output signal D21. In other words, an angular speed is detected on the basis of a pitch of the magnetic body 11 attached to the rotor 1 (an angular pitch measured from the center of the rotor 1).

Figure 2:
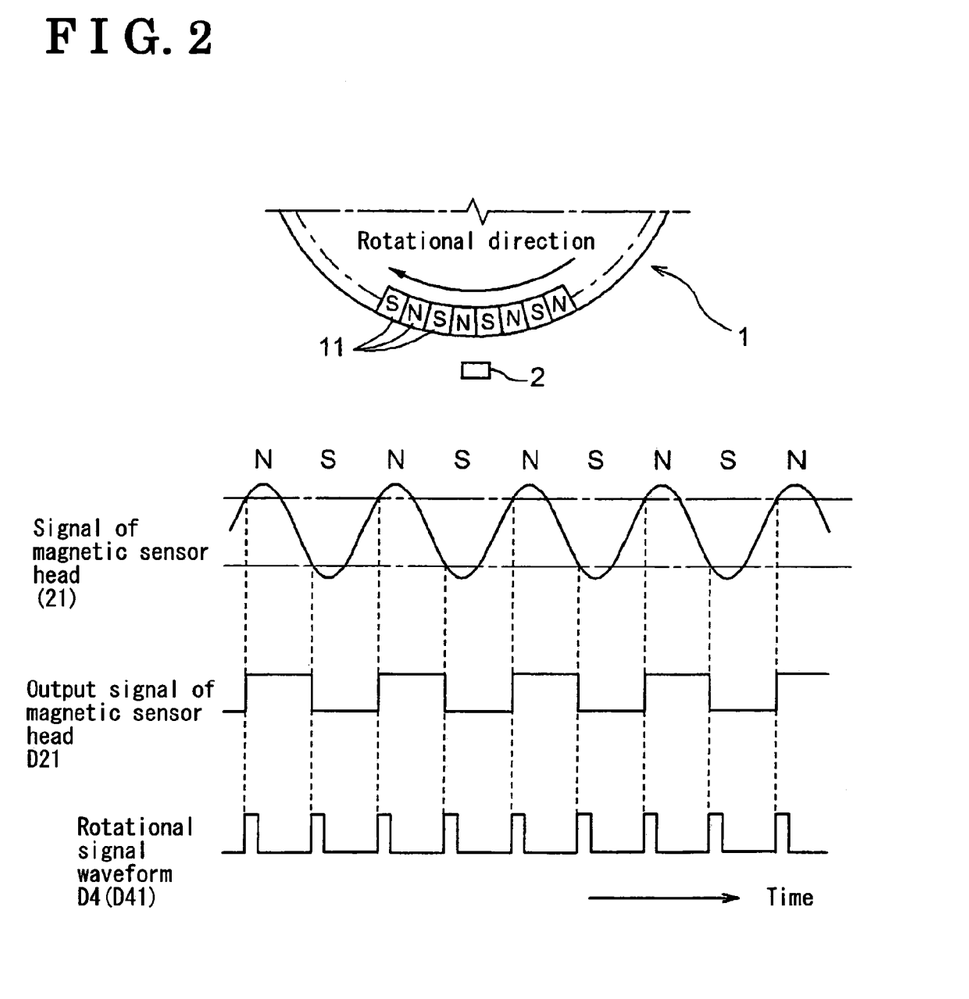
FIG. 2 represents a principle of a detection of rotation by means of a magnetic sensor.

In addition, in the embodiment, a detection signal measured by a magnetic sensor head 21 (provided at the magnetic sensor 2) in the form of a sine wave is transformed into a square wave, as illustrated in FIG. 2, and then utilized as the magnetic sensor output signal D21. The transformation of the waveform can be performed in a dedicated waveform-transforming circuit, or a circuit included in the magnetic sensor 2, the rotational speed-detecting circuit 3, or the rotational signal waveform-generating circuit 4.

The rotational signal waveform-generating circuit 4 generates a pulsed rotation signal waveform D4 (a first output waveform D41). Because the rotational signal waveform D4 is generated on the basis of the magnetic sensor output signal D21, as illustrated in FIG. 2, a time period of the rotational signal waveform D4 corresponds to an angular speed of the rotor 1.

On the other hand, a pseudo rotational signal waveform-generating circuit 5 (pseudo output waveform-generating means) generates a pseudo rotational signal waveform D5 (pseudo output waveform) having a time period independent of the angular speed of the rotor 1. This time period is determined on the basis of a minimum speed that is capable of being calculated (minimum vehicle speed required for calculation performed in the system. For example, the minimum vehicle speed is determined to be 1 km/h or higher in the case of an anti-lock brake system) for a system according to the embodiment of the present invention.

In the described configuration, even when the magnetic sensor 2 itself becomes incapable of detecting a rotation of the rotor 1, the rotation-detecting apparatus according to the embodiment of the present invention can emit a signal on the basis of the pseudo rotational signal waveform D5 that corresponds to the rotational signal waveform D4. In addition, according to the embodiment of the present invention, the pseudo rotational signal waveform D5 of the appropriate time period (not unnecessarily long) can be generated by determining the period of the pseudo rotational signal waveform D5 so as to correspond to the minimum speed capable of being calculated (minimum detection speed) for the rotation-detecting apparatus.

Figure 3:
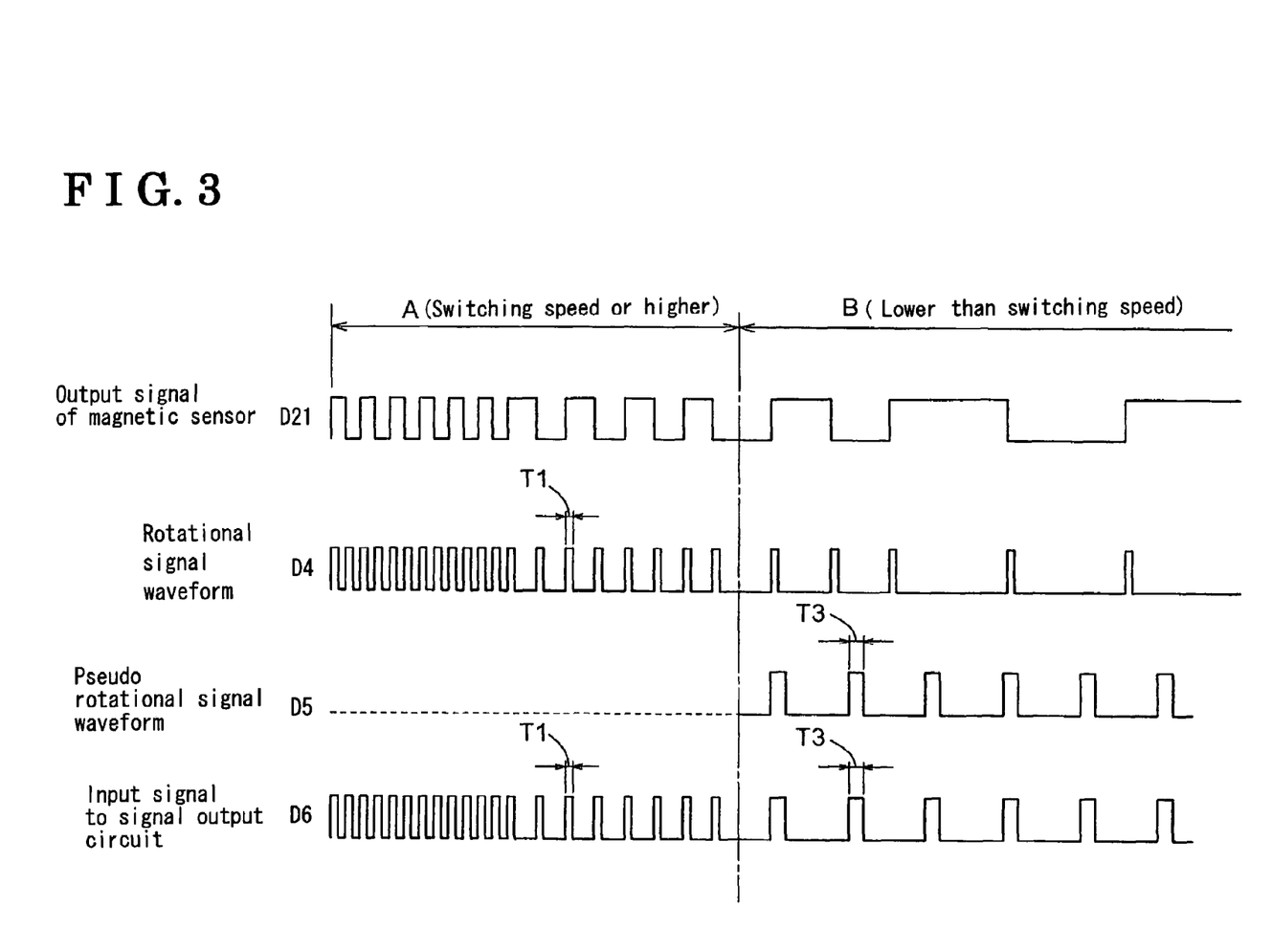
FIG. 3 represents a waveform chart illustrating an example of a rotational signal waveform.

The rotational signal waveform D4 and the pseudo rotational signal waveform D5 are made to have not only different time periods but also a form of pulses for both waveforms such that both signals can be identified in a processing circuit of downstream processes. Here, as illustrated in FIG. 3, a pulse width of the rotational signal waveform D4 synchronized with the output signal D21 of the magnetic sensor 2 is defined as T1. A pulse width of the pseudo rotational signal waveform D5 not synchronized with the output signal D21 of the magnetic sensor 2 is defined as T3. Thus, both waveforms can be identified by the difference between the pulse widths.

An output-selecting circuit 6 selects either the rotational signal waveform D4 or the pseudo rotational signal waveform D5 on the basis of the speed detected by the rotational speed-detecting circuit 3, and emits the selected signal to a signal output circuit 8. The dividing line of speed between which selection of the two signals is based is referred to as a switching speed. In the circuit configuration described in FIG. 1, the output signal-selecting circuit 6 selects either the rotational signal waveform D4 or the pseudo rotational signal waveform D5 on the basis of a switching signal D3 emitted from the rotational speed-detecting circuit 3, and emits the selected waveform D6 to the signal output circuit 8.

As illustrated in FIG. 3, when the rotational speed of the rotor 1 is detected to be equal to the switching speed, or higher (duration A), the rotational signal waveform D4 is selected, and emitted to the signal output circuit 8.

A code-generating circuit 7 (transfer signal-generating means) codes and emits items of additional data, which are combined with the rotational signal waveform D4 (or the pseudo rotational signal waveform D5). These items of additional data are the results of inspections performed by a self-inspection circuit 9 and transmitted information D72 transmitted from an other sensor such as an air pressure sensor provided near the rotor 1. The self-inspection circuit 9 monitors an output transmitted from the magnetic sensor 2 or a signal transmitted from each block included in the rotation-detecting apparatus (the flow of signals is not illustrated). Thus, the rotation-detecting apparatus is self-inspected.

The code-generating circuit 7 converts the items of information (transmitted information) of the additional data, which had been transmitted as described above, into items of data in the form of binary serial data of a predetermined data length, adds bit codes that respectively indicate a head and a tail of the serial data (start bit, stop bit) to the items of data converted, and thus generates coded items of the additional data D71 (transfer signals).

Figure 4:
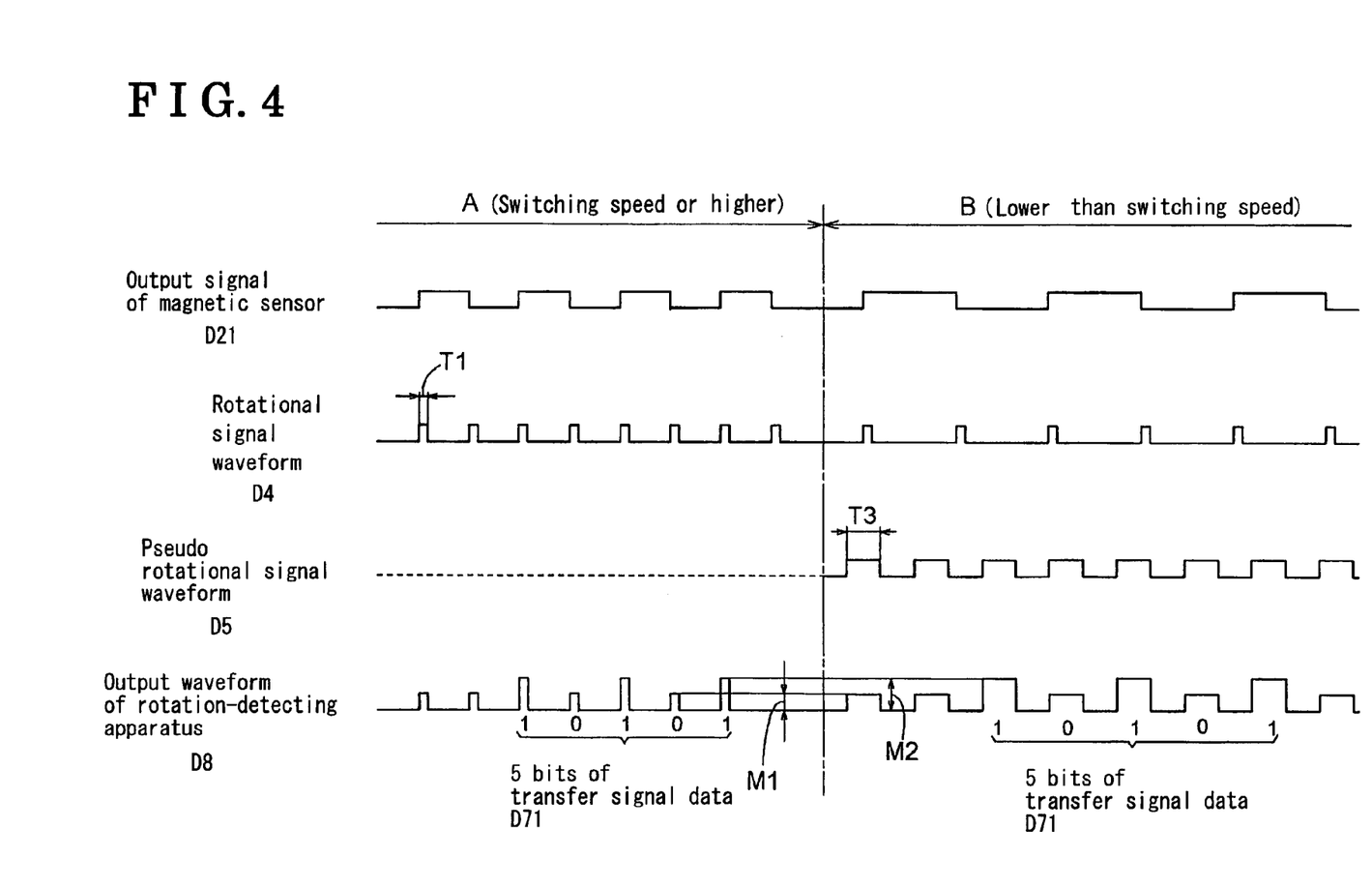
FIG. 4 represents a waveform chart illustrating an example of an output waveform of the rotation-detecting apparatus.

The signal output circuit 8 combines the coded items of the additional signal D71 with either the rotational signal waveform 4 or the pseudo rotational signal waveform D5, and emits the combined signal. FIG. 4 represents a synthesis of the coded items of the additional data D71. Here, the items of additional data D71 are indicated as 5 bits serial data, "10101". In addition, "1" disposed at the head of the serial data indicates a start bit, and "1" disposed at a tail of the serial data indicates a stop bit.

When the rotor 1 is rotating at a level of speed equal to or greater than the switching speed (duration A illustrated in FIG. 4), the serial data is combined with the rotational signal waveform D4. When an amplitude of the original rotational signal waveform D4 is defined as M1, a waveform of pulses of the rotational signal waveform D4 is formed so that the amplitude becomes M1 when each bit of the serial data is "0", and so that the amplitude becomes M2 when each bit of the serial data is "1". In other words, the logic of each bit is indicated by the amplitude of the waveform of the pulses.

When the rotor 1 is rotating at a level of speed less than the switching speed (duration B illustrated in FIG. 4), the serial data is combined with the pseudo rotational signal waveform D5. In the same way as in the case of the combination with the rotational signal waveform D4, the waveform of the pulses of the pseudo rotational signal waveform D5 is formed so that the amplitude becomes M1 when each bit of the serial data is "0", and so that the amplitude becomes M2 when each bit of the serial data is "1".

As described above, on the basis of the rotational speed of the rotor 1, the items of additional data D71 are combined, and the signal combined is emitted as a detected rotational signal D8. The signal output circuit 8 includes a current output circuit (not illustrated). The detected rotational signal D8 is emitted in the form of a current output. This current output is utilized in a downstream process through a resistor that has been earthed, or the like (not illustrated).

In the configuration described above, a rotation-detecting apparatus can be provided, in which additional items of data can be combined with the rotational speed signal, even when the rotor 1 is not rotating. These items of data can be combined independently of the rotational speed of the rotor 1. The signals, with which the additional items of data had been combined, can be identified clearly in a downstream process.

In addition to the above described embodiment, an additional embodiment of the present invention (first) will be explained. In the configuration according to the embodiment, information of a rotational direction of the rotor 1 can be included in the output signal.

Figure 5:
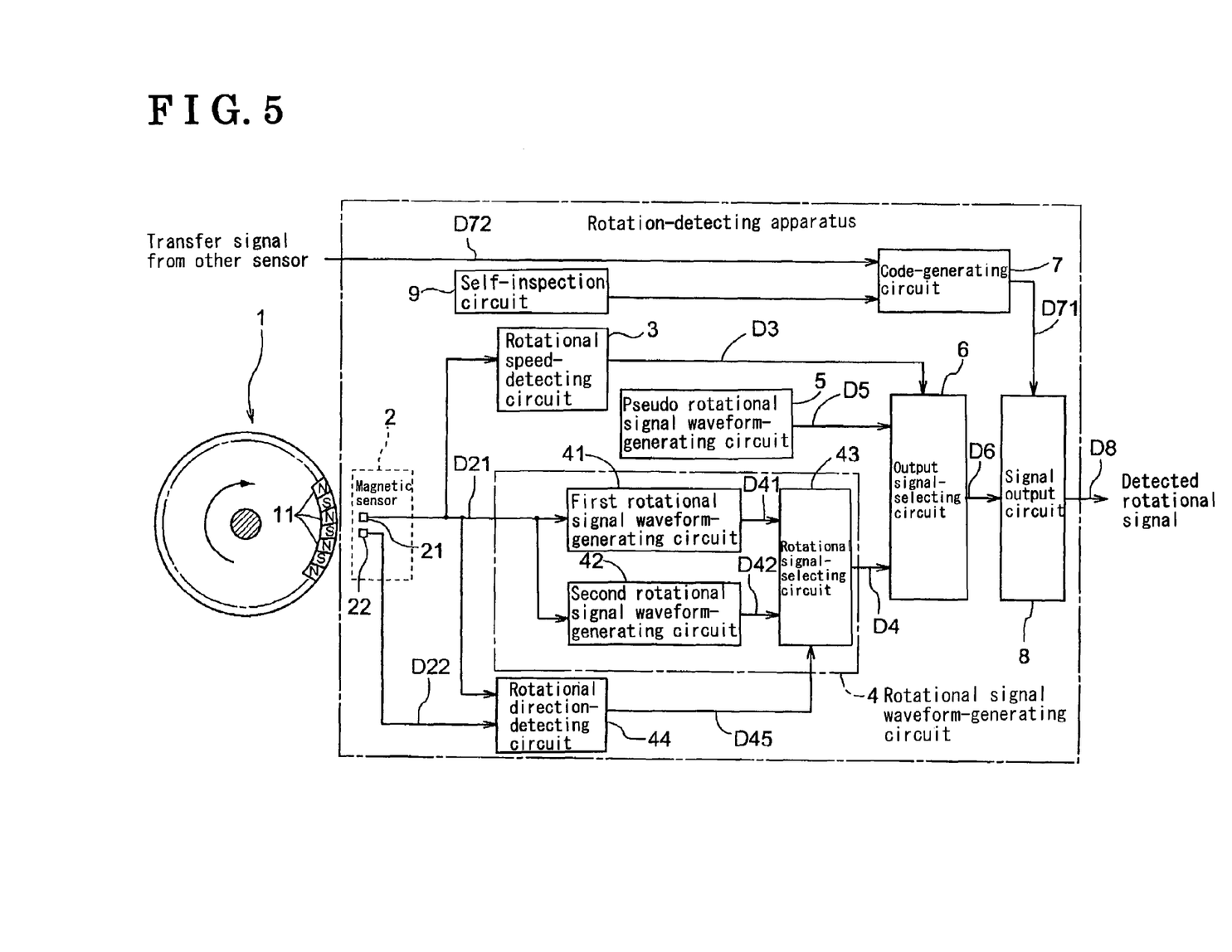
FIG. 5 represents a schematic block diagram according to an additional embodiment of the present invention.
Figure 6:
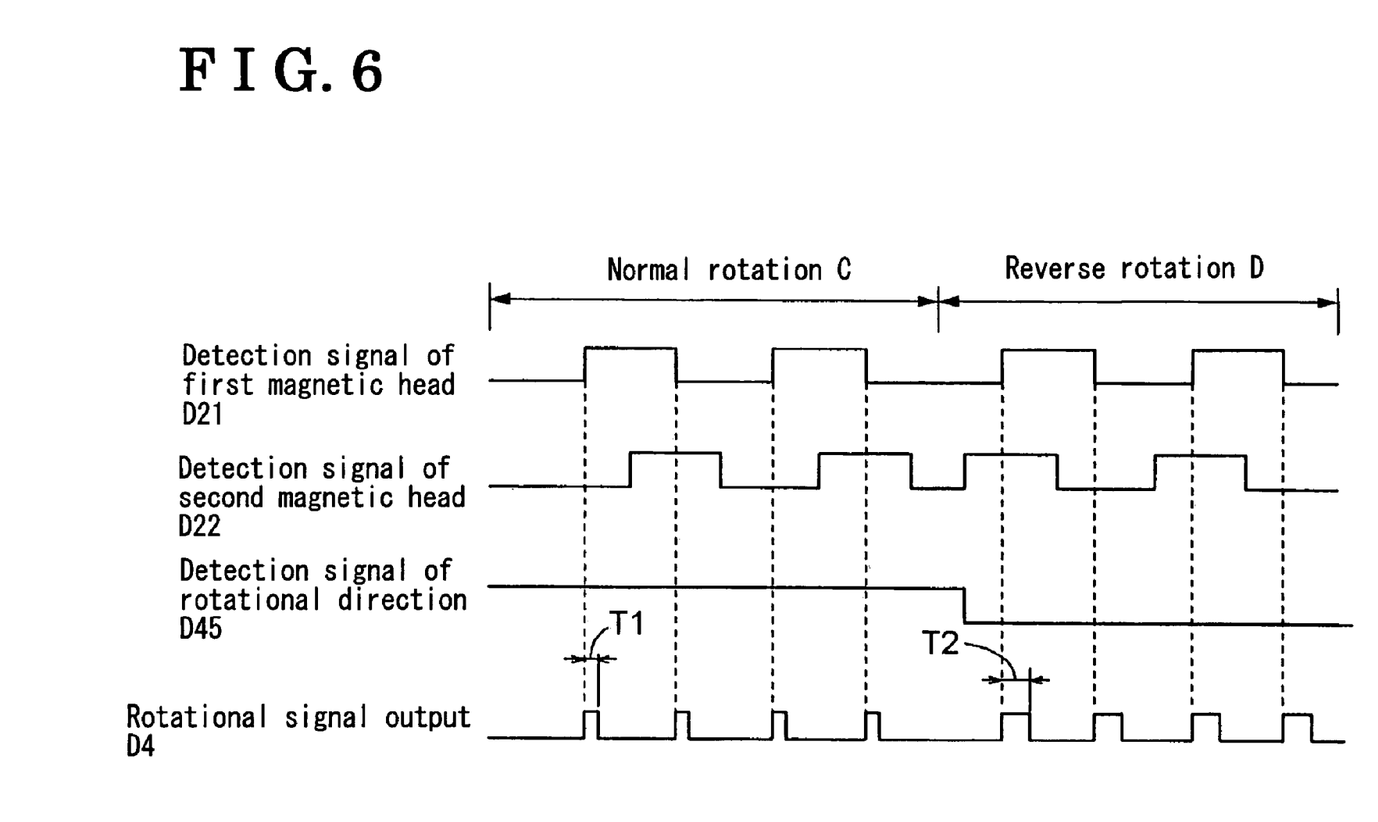
FIG. 6 represents a waveform chart for explaining an example of a detection method of a rotational direction (normal-reverse)

As illustrated in FIG. 5, the magnetic sensor 2 includes a magnetic head 21 and a magnetic head 22. A distance between a magnetic head 21 and a magnetic head 22 is set to a distance of an integral multiple of a pitch of a pairs comprising the N poles and the S poles of the magnetic body 11, plus or minus, a ¼ pitch thereof. Here, the N poles and S poles are provided around a peripheral portion of the rotor 11. Detection signals of the two magnetic heads D21 and D22, when the rotor 1 is rotating in a normal direction, and when the rotor 1 is rotating in a reverse direction, are illustrated in FIG. 6. On the basis of the two signals, a rotational direction-detecting circuit 44 (a rotational direction-detecting means) detects a rotational direction of the rotor 1, and emits the detected rotational direction signal D45, as illustrated in FIG. 6.

By means of a first rotational signal waveform-generating circuit 41 (a first output waveform-generating means) and a second rotational signal waveform-generating circuit 42 (a second output waveform-generating means), on the basis of the output signal transmitted from one of the magnetic heads (in the embodiment, the magnetic head 21), the rotational signal waveform-generating circuit 4 generates two kinds of rotational signal having different waveforms.

The rotational signal-selecting circuit 43 selects either the first rotational signal waveform D41 (a first output waveform) generated or the second rotational signal waveform D42 (a second output waveform) generated on the basis of the detected rotational direction signal D45, and outputs the selected signal as the rotational signal waveform D4. In a situation illustrated in FIG. 6, the first rotational signal waveform D41 is generated with a pulse width of T1, and the second rotational signal waveform D42 is generated with a pulse width of T2.

Further, the pseudo rotational signal waveform D5 is generated by the pseudo rotational signal waveform-generating circuit 5 as a signal having a pulse width T3. The pulse width T3 of the pseudo rotational signal waveform D5 is different from that of the first rotational signal waveform D41 and that of the second rotational signal waveform D42. Thus, three signal waveforms can be obtained that have different pulse widths, T1, T2, and T3, corresponding respectively to a normal rotation, a reverse rotation, and a rotation at low speed that incorporates a situation where the rotor has stopped. Then, a transfer signal D71 is combined with the one of the three kinds of signal waveforms described above, corresponding to the rotational direction and the rotational speed, and the signal combined is emitted.

Figure 7:
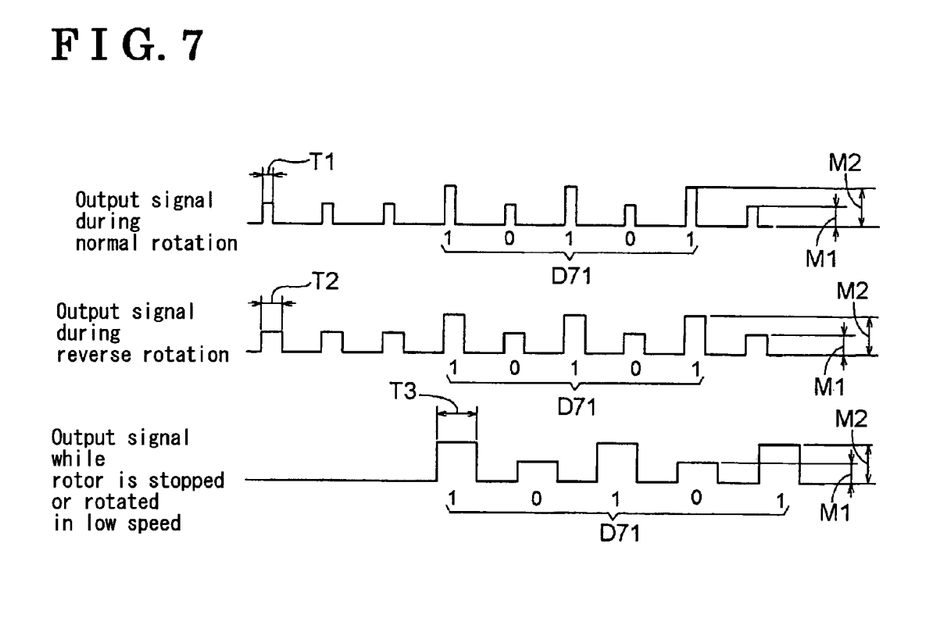
FIG. 7 represents a waveform chart illustrating an example of output waveforms of the rotation-detecting apparatus.

A signal output circuit 8 incorporates the transfer signal D71 by a process of changing an amplitude of one of the three kinds of signal described above. In other words, as illustrated in FIG. 7, when a code of the transfer signal D71 is "0", the amplitude is made M1. When a code of the transfer signal D71 is "1", the amplitude is made M2. For example, when a transfer signal D71 has a code indicated by "10101", each of the three kinds of signal becomes a waveform shown in FIG. 7. In addition, in order to facilitate comparison of the signals, FIG. 7 illustrates the three kinds of signal as having an identical period, that is not based on an actual time period.

In addition, two kinds of signal, the first rotational signal waveform D41 and the second rotational signal waveform D42, are generated and selected in the configuration according to the embodiment. This configuration is explained for purposes of easy comprehension of the circuit configuration. A constant for determining the pulse shape can be also determined on the basis of the detected rotational direction signal D45. In this situation, the rotational signal waveform D4 can be generated from one common rotational signal waveform-generating circuit.

The same method as that described above can be employed for the output signal-selecting circuit 6. The three kinds of signal waveform can be generated from one common circuit. Also in this situation, a constant for determining the pulse shape can be determined on the basis of a signal such as the detected rotational direction signal D45.

Figure 8:
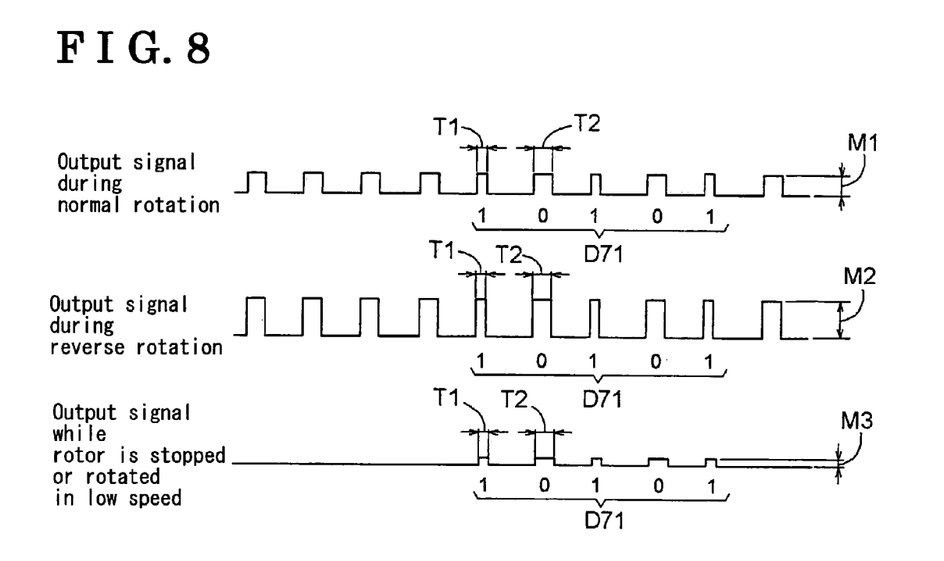
FIG. 8 represents a waveform chart illustrating an example of output waveforms of the rotation-detecting apparatus.

In addition to the above described embodiment, an additional embodiment of the present invention (second) will be explained. In the additional embodiment of the present invention (first) described above, the three kinds of signal are generated to have different pulse widths, and the codes of the transfer signal D71 is indicated by different amplitudes, but the invention is not thereby limited. Alternatively, as illustrated in FIG. 8, the three kinds of signal can be generated to have different amplitudes, and the codes of the transfer signal D71 can be indicated by different pulse widths.

In addition to the above described embodiment, an additional embodiment of the present invention (third) will be explained. In the configuration of the embodiment, different waveform patterns can be utilized. In the configuration, the first rotational signal waveform D41 and the second rotational signal waveform D42 are made to square pulses having an amplitude of M1 and having a pulse width T4 proportional to an output period of the magnetic sensor 2.

Figure 9:
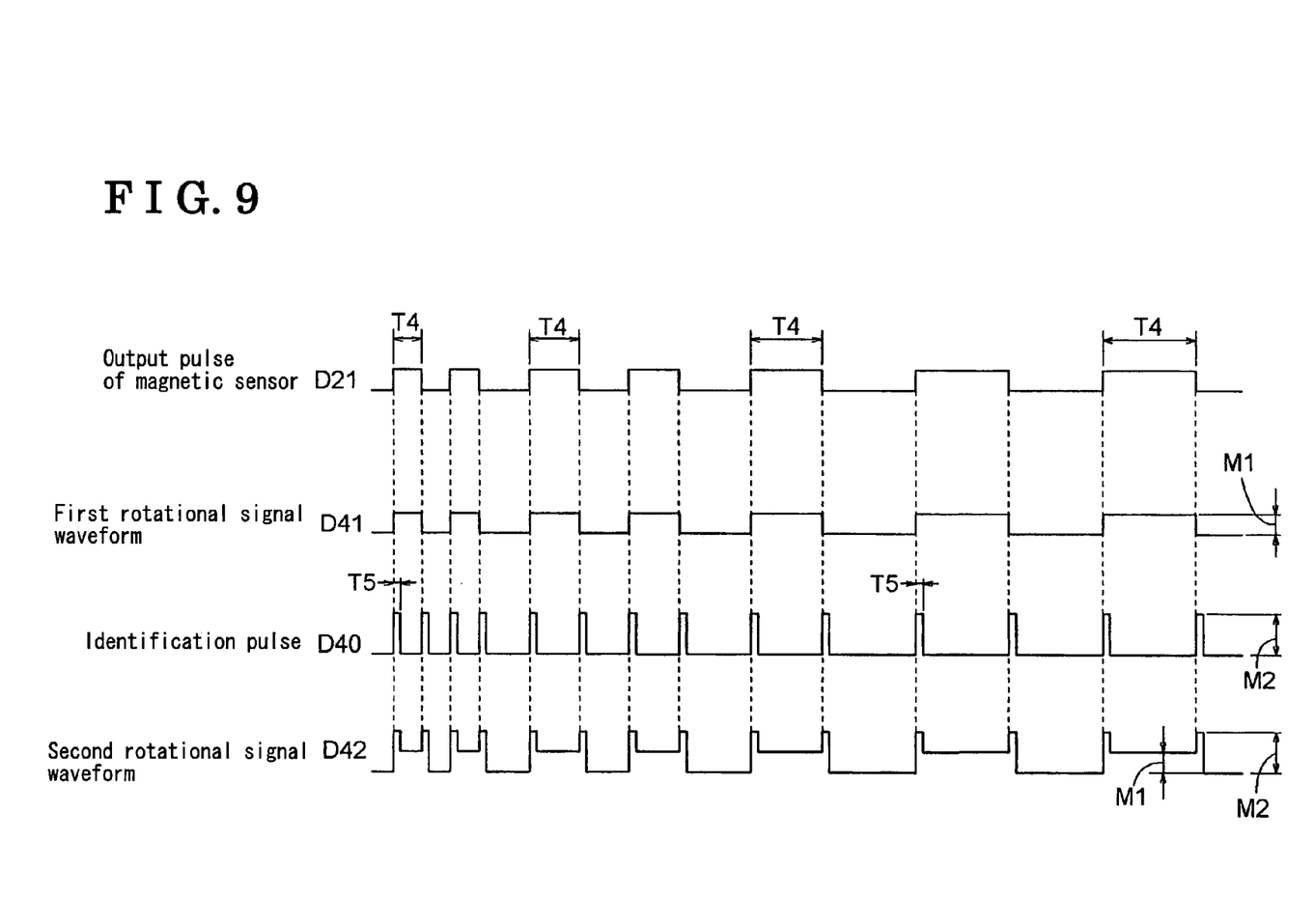
FIG. 9 represents a waveform chart illustrating an example of a rotational signal waveform.

In the embodiment, as illustrated in FIG. 9, the square pulse is made to have a pulse width T4, which is ½ of a period of an output signal D21 of the magnetic sensor 2. Then, an identification pulse 40, having an amplitude M2 greater than the amplitude of the square pulse M1 and having a pulse width T5 less than the pulse width T4, overlaps either with the first rotational signal waveform D41 or with the second rotational signal waveform D42.

In the embodiment, as illustrated in FIG. 9, the identification pulse D40 overlaps with the second rotational signal waveform D42. In addition, a pulse width T5 of the identification pulse 40 is made less than a duration T6, which will be described below.

On the other hand, the pseudo rotational signal D5 generated when the rotor 1 is at a stop, or being rotated at low speed, is generated as a square pulse having a duty ratio of 50%, and as having a period that is not synchronized with the rotational sensor 2. Although the shape of the square pulse of the pseudo rotational signal D5 is similar to that of the first rotational signal waveform D41, in situations where the period of the pseudo rotational signal waveform D5 is set to a maximum length of period which is reasonable for practical purposes, the pseudo rotational signal waveform D5 can be separately identified from the first rotational signal waveform D41. Thus, the three kinds of signal are generated.

Figure 10:
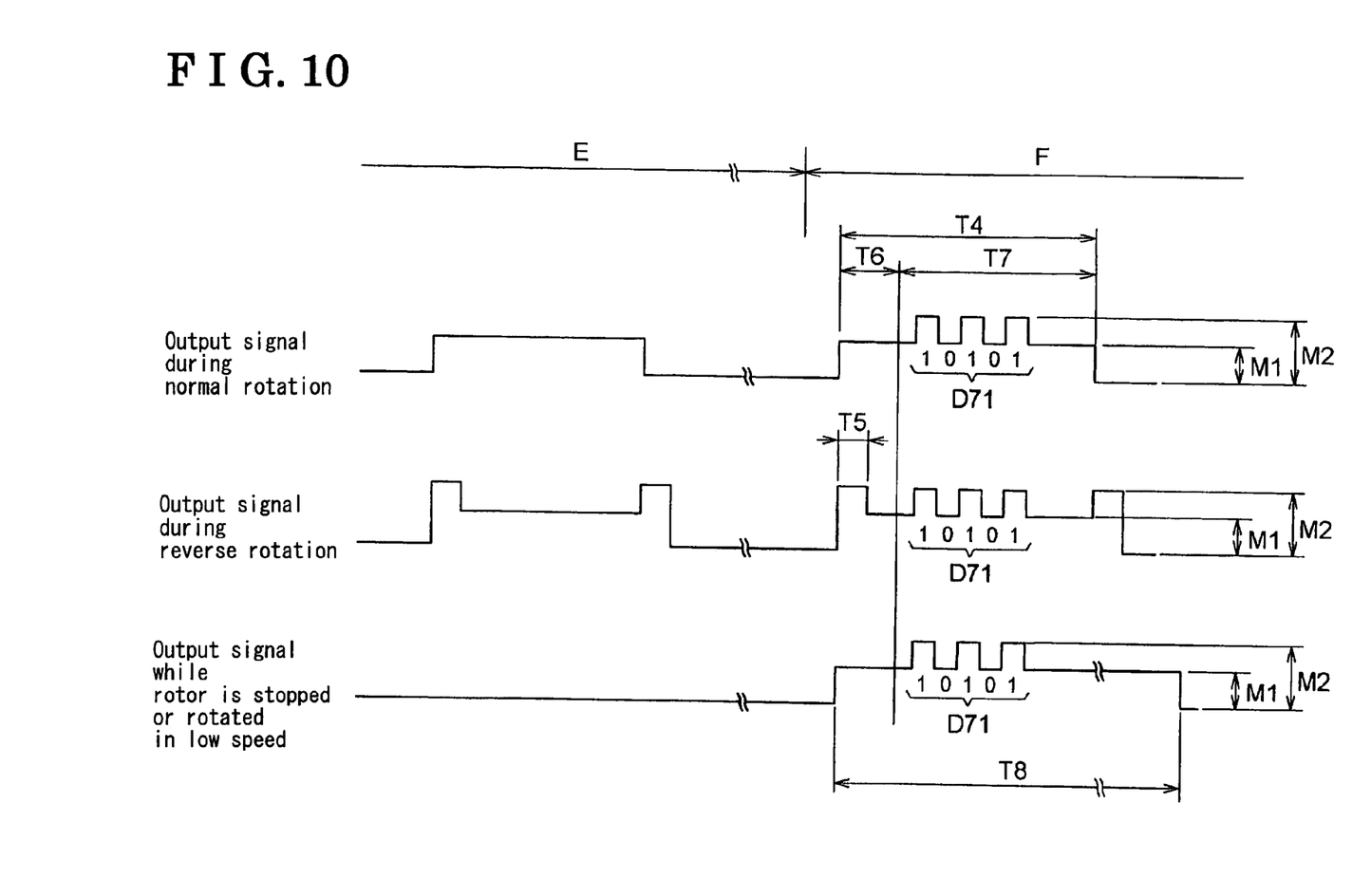
FIG. 10 illustrates a waveform chart illustrating an example of output waveforms of the rotation-detecting apparatus.

FIG. 10 illustrates a process of combining the transfer signal D71 of the code "10101" with the three kinds of signal. In a duration E illustrated in FIG. 10, there is no transfer signal D71. In a duration F illustrated in FIG. 10, the transfer signal D71 is combined with the three kinds of signal. In addition, the pseudo rotational signal D5 is generated as a square pulse, having a pulse width T8 which is different from the pulse width T4 of the first rotational signal waveform D41, and having a period of T8×2 (in other words, a square pulse having a duty ratio of 1/2).

In the duration F illustrated in FIG. 10, a pulse width T4 of the first rotational signal waveform D41 is separated into a duration T6 (a first duration) and a duration T7 (a second duration). A length of the duration T6 is made constant, independent of the pulse width T4 (and T8). On the other hand, the duration T7 is varied in relation to the pulse width T4, expressed in terms of T7=T4−T6.

Moreover, the transfer signal D71 is not combined with the three kinds of signal for the duration T6, but is combined for the duration T7. For combining the transfer signal D71, a transfer signal pulse having a pulse width T5 and an amplitude M2, both similar to those of the identification pulse 40, are utilized. If the signal having a pulse width of T5, and having an amplitude M2, is recognized during the duration T6, the signal recognized is identified as an identification signal for indicating a rotational direction. If the signal is recognized during the duration T7, the signal recognized is identified as coded information of the transferred information D71.

The transferred information D71 is combined with the pseudo rotational signal D5 in a similar manner to when the rotor 1 has stopped, or to when the rotor 1 is being rotated at low speed. In the duration T6 within the pulse width T8 of the pseudo rotational signal D5, the transferred information D71 is not combined with the pseudo rotational signal D5. Within the duration T8, excluding the duration T6, the transferred information D71 is combined with the pseudo rotational signal D5.

When the level of rotational speed of the rotor 1 becomes high, although the length of the duration T7 is abbreviated commensurately with the increase in rotational speed, the length of the duration T6 is made constant. Therefore, even when the level of rotational speed of the rotor 1 is high, the rotational direction can be identified with ease.

On the other hand, when the length of duration T7 becomes short, the number of bits of the transfer data D71 capable of being overlapped is reduced. To compensate for the reduction in bits, the number of bits of the transfer signal D71 to be overlapped is reduced in accordance with the length of the duration T7 so that the transfer signal pulse is not broken apart between the pulses. Because the rotational speed can be detected by use of the rotational speed-detecting portion 3 (rotational speed-detecting circuit 3), the control described above can be performed by means of detecting the rotational speed by use of the rotational speed-detecting portion 3, and by means of transmitting the detection results to the signal output circuit 8 (not illustrated in figures).

If the entire codes of the transfer signal D71 can not overlap with one cycle, the entire codes of the transfer data D71 can overlap with plural cycles. Even when the transfer signal D71 overlap with plural cycles, because the start bit and the stop bit are disposed at the serial data, items of additional information can be properly recognized in the downstream process circuit.

When the transferred information D71 is combined with the pseudo rotational signal D5, because the pulse width T8 of the pseudo rotational signal D5 is sufficiently greater than the pulse width T4 of the first rotational signal waveform D41, the transfer signal D71 can overlap with the pseudo rotational signal D5 without difficulties. If a transfer signal D71 having an extremely large number of bits has to overlap with the pseudo rotational signal D5, the transfer signal D71 can overlap with plural cycles.

In the configuration described above, a rotation-detecting apparatus, in which the rotational direction or other items of information can be preferably synthesized independent from the rotational speed, can be provided.

In addition, in the embodiments described above, such as the rotational speed-detecting circuit 3, the rotational signal waveform-generating circuits 41, 42, the code-generating circuit 7, the pseudo rotational signal waveform-generating circuit 5, the output signal-selecting circuit 6, the rotational direction-detecting circuit 44, and the signal output circuit 8 are configured by use of an electronic circuit. But the present invention is not thereby limited. These circuits can be alternatively configured by use of a computer program of microcomputer.

In the embodiments described above, the rotational signal-selecting circuit 43 selects either the first rotational signal waveform or the second rotational signal waveform. Next, the output signal-selecting circuit 6 selects the first rotational signal waveform, the second rotational signal waveform, or the pseudo rotational signal waveform. Then next, the signal output circuit 8 combines the transfer signal with the waveform selected. However, generation procedure of the output signal is not limited to sequence described above. If a signal waveform generated is the same as that described above, a signal waveform can be generated by other sequence. For example, after the transfer signal is combined with each of the first rotational signal waveform, the second rotational signal waveform, and the pseudo rotational signal waveform, the waveform combined can be selected on the basis of the rotational speed and the rotational direction.

According to an aspect of the present invention, the rotation-detecting apparatus includes the pseudo output waveform-generating means for emitting the pseudo output waveform with the pulse width, which is different from that of the first output waveform, independently of the rotational period of the rotor. On the basis of the rotational speed detected by the rotational speed-detecting means, the rotation-detecting apparatus changes an amplitude of pulses either of the first output waveform and the pseudo output waveform to combine the transfer signal, and to emit the signal combined with the transfer signal.

According to the aspect of the present invention, even when the rotor is rotating at extremely low speed, or when the rotor is at a stop, the pseudo output waveform is emitted. Therefore, the transfer signal can be combined with the pseudo output waveform. Moreover, the pseudo output waveform can be separately identified from the rotational signal waveform (the first output waveform). Accordingly, the transferred information can be combined with the output signal of the rotation-detecting apparatus independently of the rotational speed of the rotor. Thus, items of data, which are obtained while a vehicle is at a stop, can be preferably combined with the output of the rotation-detecting apparatus. Further, when the rotational signal waveform and the pseudo rotational signal waveform are formed so as to have different pulse width respectively, and the transfer signal is combined with the two signal waveforms, the transfer signal is represented by an amplitude of the pulse of the two signal waveforms. Therefore, the two kinds of pulse can be separately identified in simple manner.

According to a further aspect of the present invention, the rotation-detecting apparatus includes the pseudo output waveform-generating means for emitting the pseudo output waveform having a different amplitude from that of the first output waveform, independently of the rotational period of the rotor. On the basis of the rotational speed detected by the rotational speed-detecting means, the rotation-detecting apparatus changes a pulse width of either the first output waveform and the pseudo output waveform to combine the transfer signal, and emit the signal combined with the transfer signal.

According to the aspect of the present invention, even when the rotor is rotating at extremely low speed, or when the rotor is at a stop, the pseudo output waveform is emitted. Therefore, the transfer signal can be combined with the pseudo output waveform. Moreover, the pseudo output waveform can be separately identified from the rotational signal waveform (the first output waveform). Accordingly, the transferred information can be combined with the output signal of the rotation-detecting apparatus independently of the rotational speed of the rotor. Thus, items of data, which are obtained while a vehicle is at a stop, can be preferably combined with the output of the rotation-detecting apparatus. Further, when the rotational signal waveform and the pseudo rotational signal waveform are formed so as to have different amplitude respectively, and the transfer signal is combined with the two signal waveforms, the transfer signal is represented by a pulse width of the two signal waveforms. Therefore, the two kinds of pulse can be separately identified in simple manner.

According to a further aspect of the present invention, the rotation-detecting means includes the pseudo output waveform-generating means for emitting the pseudo output waveform having a different pulse shape from that of the first output waveform, independently of the rotational period of the rotor. In the rotation-detecting apparatus, a pulse shape of the first output waveform is made a square pulse having a pulse width in relation to the rotation of the rotor. The pseudo output waveform is made a square pulse having a constant pulse width not in relation to the rotation of the rotor. A pulse width of the first output waveform and of the pseudo output waveform are separated into the first duration started at a time of rising of the square pulse and ended when a predetermined time is passed after the rising of the square pulse and the second duration within the pulse width of the square pulse excluding the first duration thereof respectively. The identification pulse having a pulse width less than that of the first duration and having an amplitude greater than that of the square pulse waveform is disposed at the changing point of the square pulse waveform of the first output waveform. On the basis of the rotational speed detected by the rotation-detecting means, the transfer signal in the form of the transfer signal pulse having substantially same shape as that of the identification pulse overlaps with the second duration either of the first output waveform or of the pseudo output waveform.

According to the further aspect of the present invention, even when the rotor is rotating at extremely low speed, or when the rotor is at a stop, the pseudo output waveform is emitted. Therefore, the transfer signal can be combined with the pseudo output waveform. Moreover, the pseudo output waveform can be separately identified from the rotational signal waveform (the first output waveform). Accordingly, the transferred information can be combined with the output signal of the rotation-detecting apparatus independently of the rotational speed of the rotor. Thus, items of data, which are obtained while a vehicle is at a stop, can be preferably combined by overlapping an additional pulse with the pseudo output waveform. In other words, the transferred information overlaps with the second duration of the pseudo output waveform as the transfer signal pulse. Moreover, further additional information different from the transferred information can be combined with the output signal of the rotation signal waveform by overlapping the identification pulse having a same shape as that of the transfer signal pulse with the first duration of the rotational signal waveform. Accordingly, by utilizing combinations of the small number of kinds of an elemental waveform shape, many items of information can be combined (overlapped) with the output signal of the rotation-detecting apparatus independently of the rotational speed of the rotor.

According to a further aspect of the present invention, the rotation-detecting apparatus includes the rotational direction-detecting means for detecting the rotational direction of the rotor and the second output waveform having a pulse shape different from that of the first output waveform and the pseudo output waveform. The second output waveform is synchronized with the rotation of the rotor. The rotation-detecting apparatus selects either the first output waveform or the second output waveform as a rotational signal waveform on the basis of the rotational direction detected by the rotational direction-detecting means. The rotation-detecting apparatus combines the transfer signal to either of the rotational signal waveform or the pseudo output waveform on the basis of the rotational speed detected by the rotational speed-detecting means, and emits the signal combined.

According to the aspect of the present invention, the rotation-detecting apparatus can detect the rotational direction of the rotor. The detected rotational direction can be emitted together with the output signal of the rotation-detecting apparatus. Therefore, the rotational direction and the transferred information can be combined with the output signal of the rotation-detecting apparatus independently of the rotational speed of the rotor. Accordingly, even when the rotor is rotating at extremely low speed for changing the rotational direction, or when the rotor is at a stop, the transfer signal generated from the transferred information can be preferably included in the output signal.

For example, when three kinds of output waveform (the first output waveform, the second output waveform, and the pseudo output waveform) are generated to have respectively varied pulse width, and the transfer signal is combined with one of the waveforms, if contents of the transfer signal is indicated by the amplitude of the pulse, the three kinds of pulse can be easily identified. In this configuration, the rotational direction can be recognized from only the pulse width, and the contents of the transfer signal can be recognized from only the amplitude. Thus, the output signal of the rotation-detecting apparatus can be effectively utilized.

Moreover, for example, when three kinds of output waveform (the first output waveform, the second output waveform, and the pseudo output waveform) are generated to have respectively varied amplitude of the pulse waveform, and the transfer signal is combined with one of the waveforms, if contents of the transfer signal is indicated by the pulse width of the pulse, the three kinds of pulse can be easily identified. In this configuration, the rotational direction can be recognized from only the amplitude of the pulse waveform, and the contents of the transfer signal can be recognized from only the pulse width. Thus, the output signal of the rotation-detecting apparatus can be emitted in the form which can be easily utilized in the downstream process.

Further, for example, when the rotational direction information overlaps with the first duration of the output waveform as the identification signal, and the transferred information is overlapped with the second duration of the output waveform as the transfer signal pulse, by utilizing combinations of the small number of kinds of an elemental waveform shape, many items of information can be combined with the output signal of the rotation-detecting apparatus independently of the rotational speed of the rotor.

According to a further aspect of the present invention, a period of the pseudo output waveform can be set either to a period corresponding to minimum rotational speed capable of being detected by the speed-detecting means, or to a period corresponding to minimum rotational speed capable of being detected by the rotation-detecting apparatus itself.

According to the aspect of the present invention, the period of the pseudo output waveform is set to a period corresponding to a detectable rotational speed, in other words, a period corresponding to a rotational speed, or the like, which is basis of selection of either the rotational signal waveform or the pseudo output waveform. Accordingly, the period of the pseudo output waveform does not become too long. The transfer signal can be included in the output signal with an appropriate period, and the signal combined can be emitted at appropriate period. In addition, minimum rotational speed detectable can be exampled as a minimum speed required for calculation performed by the system according to the present invention (minimum vehicle speed required for calculation performed by the system, for example, the minimum vehicle speed is set to 1 km/h in an anti-lock brake system).

Moreover, it is preferable that the rotation-detecting apparatus further includes a self-inspection means, and generates the transfer signal by means of the transfer signal-generating means on the basis of a self-inspection signal emitted by the self-inspection means.

According to this configuration, not only a rotational frequency, but also items of information of the rotational direction and results of the self-inspection are obtained, the transfer signal is generated on the basis of the items of information, and the output signal is synthesized so as to include the transfer signal. In this configuration, preferably practical embodiment can be obtained.

Moreover, the rotation-detecting apparatus can include an external input means. In this configuration, the transfer signal can be generated by the transfer signal-generating means on the basis of the transferred information externally transmitted.

In this configuration, because the transfer signal is generated on the basis of external signals such as outputs from an other detecting means (sensor elements, or the like) disposed near the rotor or the rotation-detecting means, the output signal is combined with the output signal, and the signal combined is emitted, the transferred information obtained even when the vehicle is at a stop can be effectively utilized.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotation detecting apparatus, comprising:
   a rotation detecting means for detecting a rotation of a rotor;
   a rotational speed-detecting means for detecting a rotational speed of the rotor;
   a transfer signal-generating means for generating a digitized transfer signal on the basis of items of transferred information;
   a pulsed first output waveform synchronized with rotation of the rotor;
   a pseudo output waveform having a period independent of the period of the rotation of the rotor and having a first property that is different from that of the first output waveform;
   wherein said output selection means selects the first output waveform when the rotational speed of the rotor is equal to or higher than a switching speed indicating a dividing line of speed between selection of the output waveforms, and said output-selecting means selects the pseudo output waveform when the rotational speed of the rotor is lower than the switching speed,
   wherein a second property of the output waveform selected is changed on the basis of the transfer signal.

2. The rotation-detecting apparatus according to claim 1, wherein
   the first property of the waveform is a pulse width; a pulse width of the pseudo output waveform is different from that of the first output waveform; the second property of the waveform is an amplitude; and the amplitude of the output waveform selected is changed on the basis of the transfer signal.

3. The rotation-detecting apparatus according to claim 1, wherein
the first property of the output waveform is an amplitude; the amplitude of the pseudo output waveform is different from that of the first output waveform; the second property of the output waveform is a pulse width; the pulse width of the output waveform selected is changed on the basis of the transfer signal.

4. The rotation-detecting apparatus according to claim 1, wherein
the first output waveform is a square pulse waveform having a pulse width proportional to rotation of the rotor; the pseudo output waveform is a square pulse waveform having a constant pulse width not proportional to rotation of the rotor; on the basis of the rotational speed detected by the rotational speed-detecting means, the transfer signal in the form of a transfer signal pulse having a pulse width less than either that of the first output waveform or that of the pseudo output waveform and having an amplitude greater than that of the square pulse of either that of the first output waveform or the pseudo output waveform, overlaps with either the first output waveform or the pseudo output waveform.

5. The rotation-detecting apparatus according to claim 1, further comprising:
a rotational direction-detecting means for detecting a rotational direction of the rotor, wherein the pulsed first output waveform synchronized with rotation of the rotor, a pulsed second output waveform synchronized with rotation of the rotor and having a first property different from that of the first output waveform, or the pseudo signal waveform, not synchronized with rotation of the rotor and having a first property different from that of the first output waveform and the second output waveform, is selected on the basis of the rotational speed and the rotational direction; the second property of the signal selected is changed on the basis of the transfer signal; and the changed signal is emitted.

6. The rotation-detecting apparatus according to claim 5, wherein
the first property of the output waveform is a pulse width; the pulse width of the output waveform varies depending on whether the rotor is rotated in a normal direction, rotated in a reverse direction, or rotated at low speed; the second property of the output waveform is an amplitude; and the amplitude of the output waveform selected is changed on the basis of the transfer signal.

7. The rotation-detecting apparatus according to claim 5, wherein
the first property of the output waveform is an amplitude; the amplitude varies depending on whether the rotor is rotated in a normal direction, rotated in a reverse direction, or rotated at low speed; the second property of the output waveform is a pulse width; and the pulse width of the output waveform is changed on the basis of the transfer signal.

8. The rotation-detecting apparatus according to claim 5, wherein
the first output waveform is a square pulse waveform having a pulse width corresponding to the rotation of the rotor; the pseudo output waveform is a square pulse waveform having a constant pulse width not corresponding to the rotation of the rotor; both the pulse width of the output waveform and the pulse width of the pseudo output waveform are respectively separated into a first duration that start at a time when the square pulse rises and ends when a predetermined time has passed after the rise of the square pulse, and a second duration, within the pulse width of the square pulse, excluding the first duration thereof; an identification pulse having a pulse width less than that of the first duration, and having an amplitude greater than that of the square pulse waveform, is disposed at a changing point of the square pulse waveform of the first output waveform; and on the basis of a rotational speed detected by the rotational speed-detecting means, the transfer signal, in the form of a transfer signal pulse having substantially the same shape as that of the identification pulse, overlaps with the second duration of either of the first output waveform or of the pseudo output waveform.

9. The rotation-detecting apparatus according to claim 1, further comprising:
a first output waveform-generating means for generating a pulsed first output waveform synchronized with the rotation of the rotor; and
a pseudo output waveform-generating means for generating the pseudo output waveform not synchronized with the rotation of the rotor having a first property of the output waveform different from that of the first output waveform.

10. The rotation-detecting apparatus according to claim 5, further comprising:
a first output waveform-generating means for generating a pulsed first output waveform synchronized with the rotation of the rotor;
a second output waveform-generating means for generating a pulsed second output waveform synchronized with the rotation of the rotor and having a first property of the output waveform different from the first output waveform;
a pseudo output waveform-generating means for generating a pseudo output waveform not synchronized with the rotation of the rotor and having a first property different from that of the first output waveform.

\* \* \* \* \*